(12) United States Patent
Varela

(10) Patent No.: US 6,871,723 B2
(45) Date of Patent: Mar. 29, 2005

(54) INDEPENDENT SUSPENSION SYSTEM FOR A LOW FLOOR VEHICLE

(75) Inventor: Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 476 days.

(21) Appl. No.: 09/841,343

(22) Filed: Apr. 24, 2001

(65) Prior Publication Data

US 2002/0153690 A1 Oct. 24, 2002

(51) Int. Cl.⁷ .............................................. B60K 17/04
(52) U.S. Cl. ..................................... 180/348; 180/371
(58) Field of Search ........................ 180/348, 353–354, 180/356, 359–361, 363, 371, 374–376

(56) References Cited

U.S. PATENT DOCUMENTS

| | | | |
|---|---|---|---|
| 502,313 A | 8/1893 | McCutcheon | |
| 2,589,863 A | 3/1952 | Quartullo | |
| 4,362,221 A | * 12/1982 | Manning | 180/353 |
| 5,222,568 A | 6/1993 | Higasa et al. | |
| 5,878,830 A | 3/1999 | Ruppert et al. | |
| 5,924,504 A | 7/1999 | Ruppert, Jr. et al. | |
| 5,931,255 A | * 8/1999 | Sewell | 180/374 |
| 6,095,005 A | * 8/2000 | Tanzer et al. | 74/390 |
| 6,193,007 B1 | * 2/2001 | Lie | 180/374 |

FOREIGN PATENT DOCUMENTS

| DE | 41 12 624 C1 | 10/1992 |
|---|---|---|
| JP | 59160623 | * 9/1984 |
| JP | 2001270312 | * 10/2001 |

* cited by examiner

Primary Examiner—Paul N. Dickson
(74) Attorney, Agent, or Firm—Carlson, Gaskey & Olds

(57) ABSTRACT

A first and second hub assembly supported by an independent suspension system allows the independent articulation of each hub assembly. An input gear box includes a reduction gear set that drives a reduction gear set at each hub assembly. The input gear box is mounted offset from the first axis and the vehicle longitudinal axis to simultaneously drive both hub assemblies to allow a lowered vehicle floor profile.

20 Claims, 3 Drawing Sheets

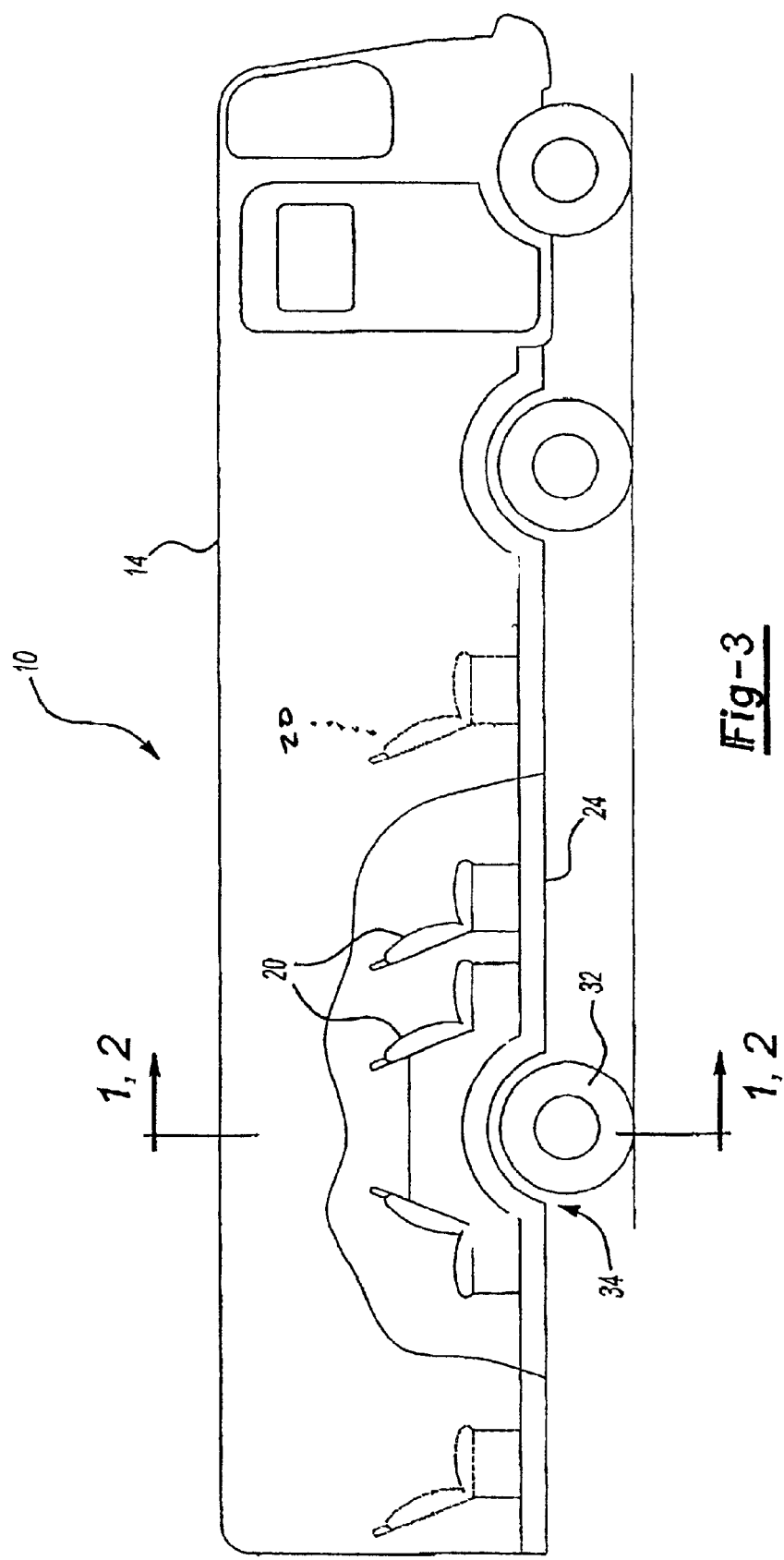

INDEPENDENT SUSPENSION SYSTEM FOR A LOW FLOOR VEHICLE

BACKGROUND OF THE INVENTION

This invention relates to an independent suspension system, and more particularly an independent suspension system for a mass transit vehicle which provides a significantly lower floor profile.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time if the bus stops and more comfort to all passengers, in special children, elderly and passengers with disabilities.

Mass transit vehicles typically have several axles which support, drive and steer the vehicle. Many such vehicles provide a rigid axle having a gear box at a longitudinal end to form an inverted portal axle configuration. Disadvantageously, this arrangement necessarily eliminates the ride benefits of independent suspension systems.

In other known embodiments, independent suspension systems have been available with either a single reduction carrier on relatively lighter vehicles or a double reduction system on relatively heavier vehicles. The reduction carriers are located along the axle centerline in these known independent suspension systems and thus take up a significant amount of packaging space. As these components are aligned along the longitudinal axis of the vehicle, the floor profile must be raised for a significant length of the vehicle. Raising the floor profile in such a manner requires the passengers to climb up to a platform above the axle, which renders that portion of the bus either inaccessible or uncomfortable for people with disabilities.

Accordingly, it is desirable to provide an independent suspension system while maintaining a low floor profile to improve access to the vehicle.

SUMMARY OF THE INVENTION

The instant invention includes a first and second hub assembly supported by an independent suspension system which allow the independent articulation of each hub assembly. The hub assemblies define a first axis substantially transverse to a vehicle longitudinal axis.

In one embodiment, an input gear box is mounted directly to the first hub gear box to provide a torque input thereto. The input gear box further includes a coupling extending therefrom to receive an input from a drive source such as vehicle engine. The input gearbox is mounted offset from the first axis and the vehicle longitudinal axis while simultaneously driving both hub assemblies. The coupling and the drive shaft provide input over an angular envelope commensurate with the articulation range of the independent suspension system.

In another embodiment, an input gear box is independently mounted to a second profile segment of the vehicle floor which defines an aisle floor. The input gear box is mounted along the vehicle longitudinal axis offset from the first axis. The input gear box includes a coupling extending therefrom to receive an input as described above to drive the first and second hub gear boxes through a first and second drive shaft.

The instant invention thereby provides an independent suspension system which increases the amount of packaging space available underneath the vehicle and allows a lower vehicle floor profile for a significantly greater length of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a longitudinal view of a vehicle, showing a typical seating arrangement near the drive axle and the location of the cross-sectional view of FIGS. 1 and 2.

DETAILED DESCRIPTION OF A PREFERRED EMBODIMENT

Figure 1:
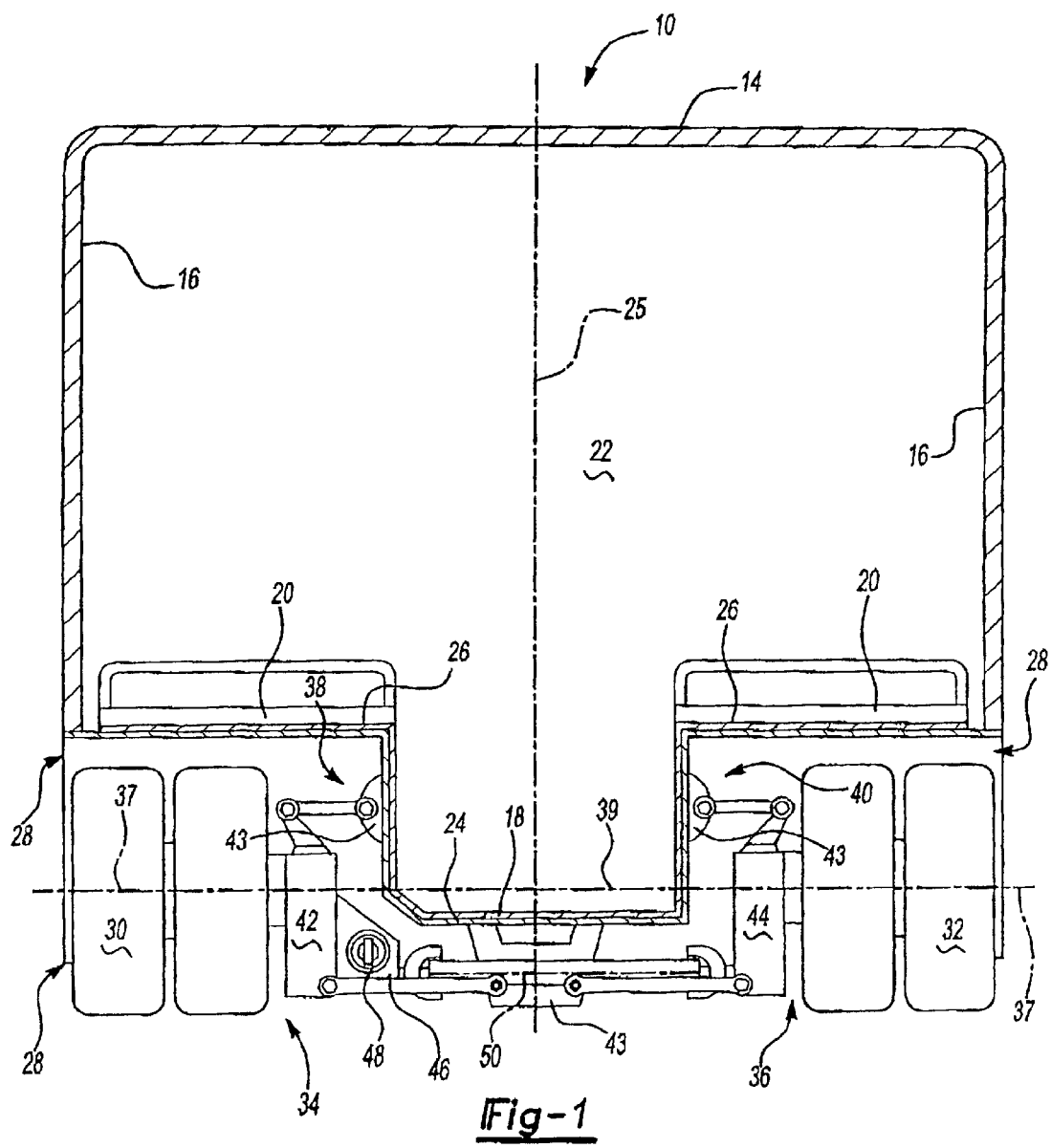
FIG. 1 is a cross sectional view of a vehicle incorporating the subject invention.

FIG. 1 schematically illustrates a cross-sectional view of a vehicle 10 which includes a passenger compartment 12 defined by a roof 14, two side walls 16, and a vehicle floor 18. The cross-sectional view is taken transverse to the vehicle length. That is, substantially along the vehicle width (FIG. 3). The vehicle 10 includes a multiple of passenger seats 20 mounted adjacent to each of the side walls 16 with a center aisle 22 extending along the length of the vehicle 10 and between the seats 20. In order to facilitate entering and exiting the vehicle 10, it is desirable to have the vehicle floor 18 and aisle 22 positioned relatively low to the ground.

The floor 18 defined beneath the passenger seats 20 and the aisle 22 preferably defines a first profile segment. The second profile segment 24 defines the floor of the aisle 22 in the axle zone while the third profile segment 26 defines the top of the wheel box. Preferably, the first profile segment 18 defines a support for a passenger seat 20 (FIG. 3). The profile segments 18, 24, 26 further define an underside 28 of the vehicle 10.

A set of vehicle wheels 30,32 are each mounted to an independent suspension system 34 adjacent the vehicle underside 28. It should be understood that vehicle 10 is typically provided with additional axles, driven and/or non-drive axles, and several sets of wheels including (as illustrated in FIG. 1) multiple pairs of wheels per axle.

A first and second hub assembly 34,36 support their respective set of wheels 30,32. The hub assemblies 34,36 each define a rotational axis 37 about which the vehicle wheels 30,32 are rotated. The hub assemblies 34,36 are each supported by an independent suspension system (illustrated somewhat schematically at 38, 40) which allow the independent articulation of each hub assembly 34,36. It should be realized that although a particular upper and lower suspension link arm configuration is illustrated in the disclosed embodiment, other independent suspension systems will benefit from the instant invention.

The independent suspension systems 38, 40 are preferably mounted between the second and third profile segments 24, 26 at mounts 43 such that the hub assemblies 34,36 define a first axis 39 substantially transverse to the vehicle longitudinal axis 25. It should be understood that the first axis 39 is defined herein at a particular static condition. In this static condition, such as when the vehicle 10 is parked or traveling over level terrain, the rotational axis 37 of both hub assemblies 34,36 are substantially aligned along the first axis 39. It will be appreciated that because of the independent suspension systems 38,40, the rotational axis 37 of the hub assemblies 34,36 may be individually displaced from the first axis 39. In other words, each hub assembly 34, 36 is individually articulatable.

A first hub gear box 42 is operably connected to the first hub assembly 34 for providing torque to drive the first set of wheels 30. A second hub gear box 44 which is effectively identical to the first hub gear box 42 is operably connected to the second hub assembly 36 for providing torque to drive the second set of wheels 32. The first and second hub gear box 42,44 include a reduction gear set for reducing a rotational input such as preferably a helical gear reduction box.

In one embodiment of the present invention, an input gear box 46 is mounted directly to the first hub gear box 42 to provide a torque input thereto. The input gear box 46 includes a reduction gear set for reducing a rotational input such as preferably a spiral/bevel gear reduction box. The input gear box 46 reduction gear set thus directly engages the first gear box 42 reduction gear set. The gear sets can include any type of gears known in the art, and can be configured for various reduction gear ratios as is known in the art. Appropriate gear reductions depending upon the drive source is well within the knowledge of one skilled in the art. The input gear box further includes a coupling 48 extending therefrom to receive an input from a drive source such as vehicle engine (not shown). Appropriate gear reductions depending upon the drive source is well within the knowledge of one skilled in the art. It should be further understood that additional drive train components may also benefit from the instant invention.

The input gear box 46 is preferably mounted offset from the first axis 39 and from the vehicle longitudinal axis 25. In other words, the input gear box 46 includes a gear set which engages the first hub gear box 42 offset from the rotational axis 37 of the first hub gear box 42. The input gear box 46 is further connected to the second hub gear box 44 through a drive shaft 50 such as a constant velocity joint. The input gear box 46 thus simultaneously drives both hub assemblies 34,36 to provide a rotation input thereto. It should be understood that the coupling 48 and the drive shaft 50 provide input over an angular envelope commensurate with the articulation range of the independent suspension systems 38,40.

Figure 2:
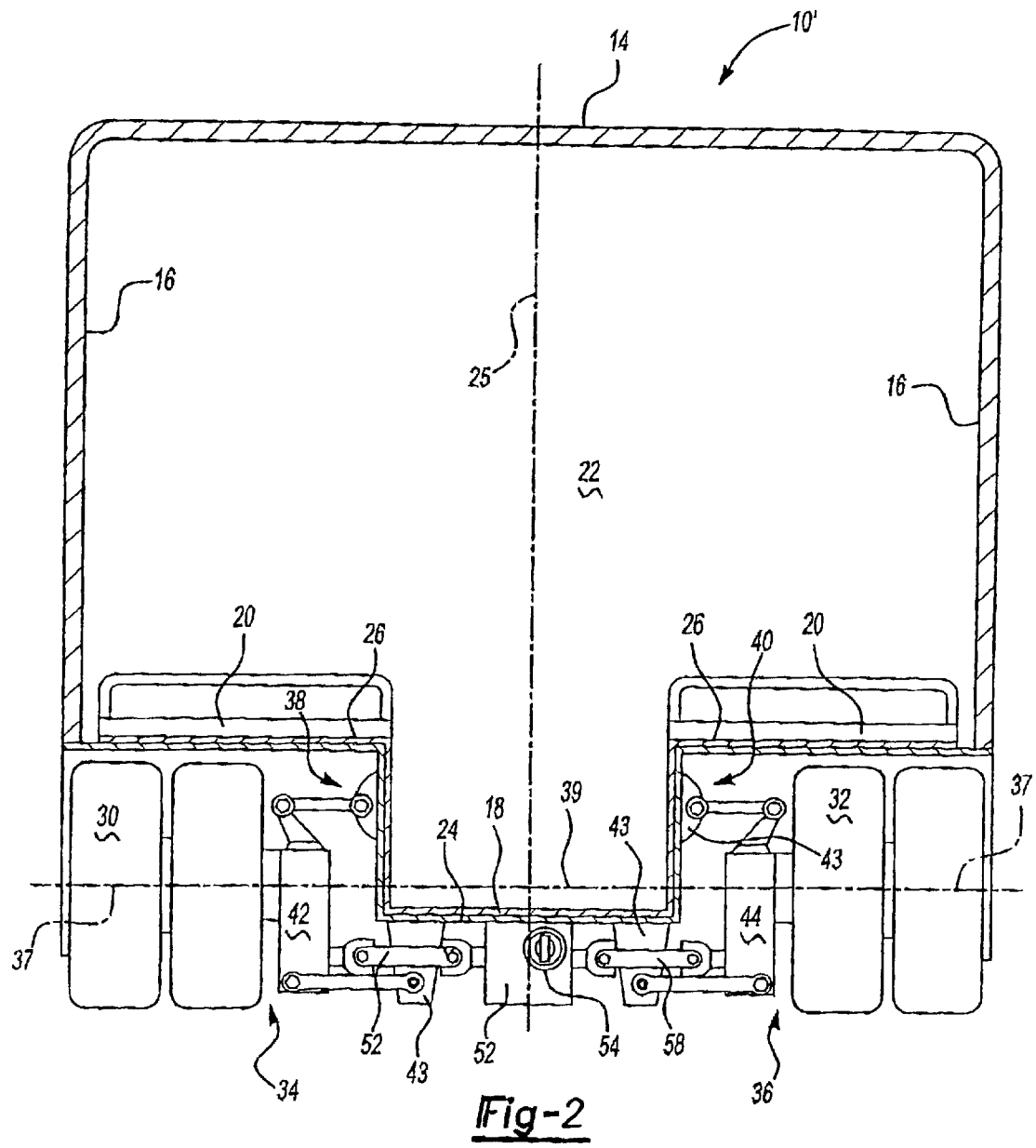
FIG. 2 is another cross sectional view of a vehicle incorporating another embodiment of the subject invention.

Referring to FIG. 2, another embodiment of the instant invention is illustrated. Equivalent drawing numerals to equivalent structure are maintained. An input gear box 52 is independently mounted to the second profile segment 24 which defines the floor of the aisle 22. The input gear box 52 is preferably mounted along the vehicle longitudinal axis 25 offset from the first axis 39.

The input gear box 52 includes a coupling 54 extending therefrom to receive an input as described above. The input gear box 52 is connected to the first and second hub gear boxes 42, 44 through a first and second drive shaft 56,58 such as a constant velocity joint. The input gear box 52 thus simultaneously drives both hub assemblies 34,36 to provide a rotation input thereto through the drive shafts 54, 56.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle independent suspension system comprising:
   a first and a second hub assembly, said first and second hub assembly having a rotational axis defining along a first axis, said first axis substantially transverse to a vehicle longitudinal axis;
   an independent suspension system independently supporting each of said first and second hub assemblies;
   a first hub gear box operably connected to said first hub assembly for providing torque to drive said first hub assembly;
   a second hub gear box operably connected to said second hub assembly for providing torque to drive said second hub assembly; and
   an input gear box offset from said first axis, said input gear box operably connected to said first and second hub gear box for providing torque thereto.

2. A vehicle independent suspension system as recited in claim 1 further including a constant velocity drive shaft interconnecting said input gear box and said first and second hub gear box.

3. A vehicle independent suspension system as recited in claim 2 wherein said constant velocity drive shaft is offset from said first axis.

4. A vehicle independent suspension system as recited in claim 1 wherein said input gear box is mounted directly to said first hub gear box, and a constant velocity drive shaft interconnects said input gear box and said second hub gear box.

5. A vehicle independent suspension system as recited in claim 4 wherein said constant velocity drive shaft is offset from said first axis.

6. A vehicle independent suspension system as recited in claim 1 wherein said input gear box includes a reduction gear set for reducing a rotational input.

7. A vehicle independent suspension system as recited in claim 6 wherein said input gear box includes a spiral/bevel gear reduction box.

8. A vehicle independent suspension system as recited in claim 1 wherein said first and second hub gear box comprises a reduction gear set for reducing a rotational input from said input gear box.

9. A vehicle independent suspension system as recited in claim 8 wherein said first and second hub gear box comprises a helical gear reduction box.

10. A vehicle independent suspension system as recited in claim 1 wherein said independent suspension system comprises a first independent suspension system independently supporting said first hub assembly; and a second independent suspension system independently supporting said second hub assembly.

11. A vehicle independent suspension system as recited in claim 10 wherein said first independent suspension system mounts adjacent a first profile segment and a second profile segment and said second independent suspension system mounts adjacent said second profile segment and a third profile segment.

12. A vehicle independent suspension system as recited in claim 11 wherein said first profile segment and said third profile segment are vertically offset from said second profile segment relative to said first and a second hub assembly.

13. A vehicle independent suspension system comprising:
- a first and a second hub assembly, said first and second hub assembly having a rotational axis defining along a first axis, said first axis substantially transverse to a vehicle longitudinal axis;
- an independent suspension system independently supporting each of said first and second hub assemblies;
- a first hub gear box operably connected to said first hub assembly for providing torque to drive said first hub assembly;
- a second hub gear box operably connected to said second hub assembly for providing torque to drive said second hub assembly;
- an input gear box mourned to said first hub gear box and offset from said first axis and laterally offset from a vehicle longitudinal axis, said input gear box operably connected directly to said first hub gear box for providing torque thereto; and
- a constant velocity drive shaft interconnecting said input gear box and said second hub gear box for providing torque thereto, said constant velocity drive shaft offset from said first axis.

14. A vehicle independent suspension system as recited in claim 13 wherein said input gear box includes a spiral/bevel gear reduction box.

15. A vehicle independent suspension system as recited in claim 13 wherein said first and second hub gear box comprises a helical gear reduction box.

16. A vehicle independent suspension system as recited in claim 13 further including a floor defined beneath a set of passenger seats, said floor having a profile with at least three profile segments wherein a first profile segment extends under the seats and along a vehicle longitudinal axis for a first length and a second profile segment which extends along said longitudinal axis for a second length adjacent to said first axis and a third profile segment above a wheel box, said third profile segment, further from said input gear box than said second profile segment, said independent suspension system attached substantially between said second and third profile segment.

17. A vehicle independent suspension system as recited in claim 13 wherein said independent suspension system comprises a first independent suspension system independently supporting said first hub assembly; and a second independent suspension system independently supporting said second hub assembly.

18. A vehicle independent suspension system as recited in claim 17 wherein said first independent suspension system mounts adjacent a first profile segment and a second profile segment and said second independent suspension system mounts adjacent said second profile segment and a third profile segment.

19. A vehicle independent suspension system as recited in claim 18 wherein said first profile segment and said third profile segment are vertically offset from said second profile segment relative to said first and a second hub assembly.

20. A vehicle independent suspension system comprising:
- a first and a second hub assembly, said first and second hub assembly having a rotational axis defining along a first axis, said first axis substantially transverse to a vehicle longitudinal axis;
- an independent suspension system independently supporting each of said first and second hub assemblies;
- a first hub gear box operably connected to said first hub assembly for providing torque to drive said first hub assembly;
- a second hub gear box operably connected to said second hub assembly for providing torque to drive said second hub assembly;
- an input gear box mounted to said first hub gear box and offset from said first axis and laterally offset from a vehicle longitudinal axis, said input gear box operably connected directly to said first hub gear box for providing torque thereto;
- a constant velocity drive shaft interconnecting said input gear box and said second hub gear box for providing torque thereto, said constant velocity drive shaft offset from said first axis; and
- a floor defined beneath a set of passenger seats, said floor having a profile with at least three profile segments wherein a first profile segment extends under the seats and along a vehicle longitudinal axis for a first length and a second profile segment which extends along said longitudinal axis for a second length adjacent to said first axis and a third profile segment above a wheel box, said third profile segment further from said input gear box than said second profile segment, said independent suspension system attached substantially between said second and third profile segment.

* * * * *

UNITED STATES PATENT AND TRADEMARK OFFICE
CERTIFICATE OF CORRECTION

PATENT NO.    : 6,871,723 B2
DATED         : March 29, 2005
INVENTOR(S)   : Varela et al.

It is certified that error appears in the above-identified patent and that said Letters Patent is hereby corrected as shown below:

Column 5,
Line 16, please "mourned" with -- mounted --

Signed and Sealed this

Twenty-eighth Day of June, 2005

JON W. DUDAS
*Director of the United States Patent and Trademark Office*